May 10, 1960

L. FARNSWORTH 2,935,882

SPEED CHANGE GEAR MECHANISM

Filed Jan. 20, 1958

INVENTOR.
LAWRENCE FARNSWORTH
BY
Lieber, Lieber & Nilles
ATTORNEYS

United States Patent Office 2,935,882
Patented May 10, 1960

2,935,882

SPEED CHANGE GEAR MECHANISM

Lawrence Farnsworth, Racine, Wis., assignor of fifty percent to Max M. Seft, Racine, Wis.

Application January 20, 1958, Serial No. 709,998

8 Claims. (Cl. 74—333)

This invention relates to gear mechanisms for effecting changes in speeds between input and output shafts. The invention finds particular utility when used with an electric motor for providing two different output speeds for the motor, or for use with a lathe for quickly changing the spindle speed thereof.

The change in speed for such applications should be capable of being effected while power is being transmitted through the mechanism, to thereby eliminate any down time of the machine. These speed change devices should also operate at good efficiency, that is, with a minimum loss of power between the driving and driven units with which it is used. Furthermore, these speed change mechanisms should be as compact as possible so as to occupy a minimum amount of space, particularly where the mechanism is to be made an integral part of a machine.

A general object of the present invention is to provide a gear speed change mechanism having all of the above mentioned desirable features.

In accordance with the present invention, a change speed gear device has been provided having a compact and novel dual clutch shifting means for simultaneous axial shifting of one clutch into engagement while another is de-clutched. More particularly, a single lever shifts two separate shifting collars in different axial directions with a single movement of the lever.

The invention also provides a compact and efficient gear ratio and clutch arrangement which contributes to an axially compact power transmission of variable speed.

The invention further contemplates a speed change device of the above type, the speed of which can be varied by simultaneous shifting of two clutches with a single movement of a lever and while power is being transmitted through the device.

These and other objects and advantages of the invention will appear hereinafter as this disclosure progresses, reference being had to the accompanying drawings, in which.

Figure 1:
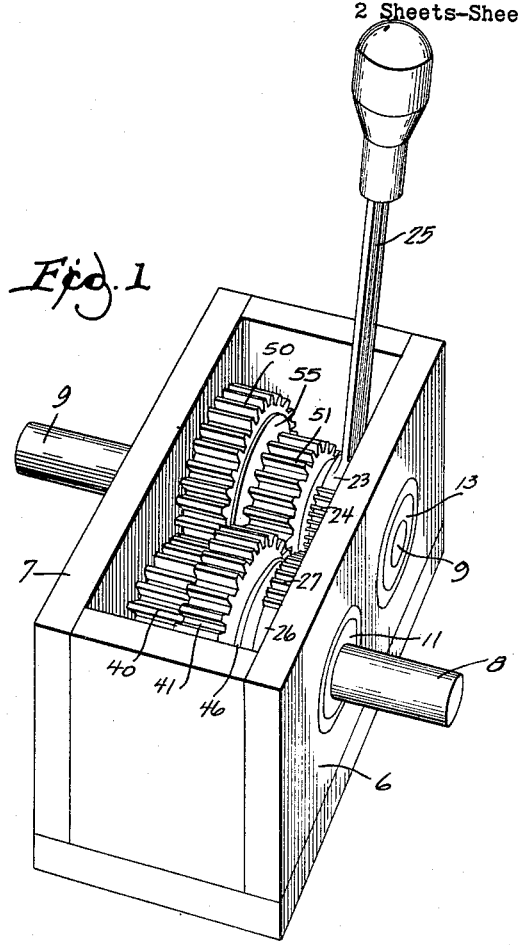
Figure 1 is a perspective view taken generally from above a mechanism embodying the invention.

Referring in greater detail to the drawings, the transmission housing or support structure shown for illustrative purposes includes a front wall 6 and a rear wall 7. An input shaft 8 and a parallel output shaft 9 are rotatably mounted in these walls in anti-friction, radial load carrying bearing assemblies 11, 12 and 13, 14 respectively.

A sleeve 17 is securely mounted in an opening 16 in wall 6 and has an externally threaded portion 18 extending into the housing. A similar sleeve 20 is rigidly secured in wall 6 and also has a portion extending into the housing which has a thread 21 on its periphery. Threads 18 and 21 are both pitched in the same direction. Bearing assemblies 11 and 13 are securely mounted in the sleeves 17 and 20, respectively.

A shifting collar 23 is threadably engaged on sleeve 20 and has a series of teeth 24 extending partially around its periphery. An operating lever 25 is integrally formed on collar 23 and extends upwardly from the housing.

Another shifting collar 26 is engaged on threads 18 of the sleeve 17 and has a series of teeth 27 on its periphery which mesh with teeth 24.

As lever 25 is swung in one direction the collar 23 moves axially in one direction on threads 21, and collar 26 simultaneously moves axially on threads 18 in the other direction, because of the similar direction of the threads 18 and 21.

A generally dish-shaped carrier ring 28 abuts against collar 23 and carries the anti-friction thrust bearing assembly 29. Another carrier ring 31 supports anti-friction thrust bearing assembly 32.

An anti-friction thrust bearing assembly 34 is mounted in the counterbore 35 of wall 7. Another anti-friction thrust bearing assembly 36 is mounted in the counterbore 37 of wall 7.

Figure 3:
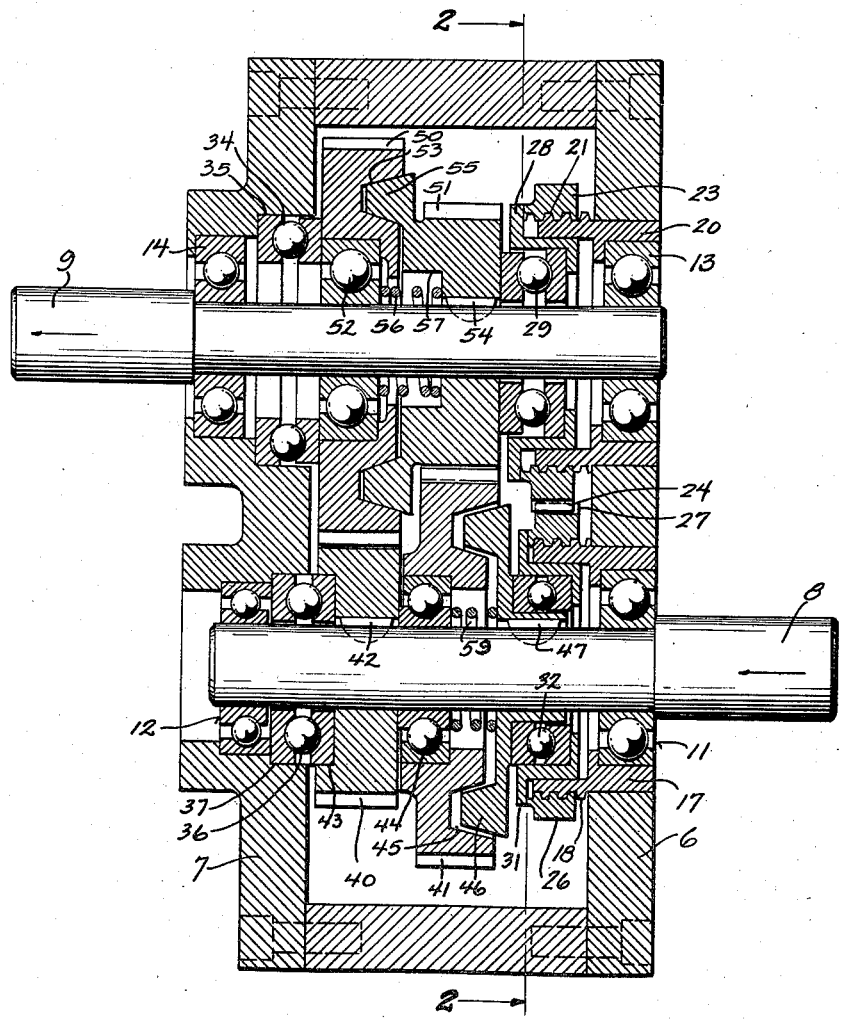
Figure 3 is a sectional view taken generally on a horizontal plane passing through the mechanism.

Mounted between the axial thrust bearings 32 and 36 are gears 40 and 41. Gear 40 is fastened by key 42 to the shaft 8 for rotation therewith. Bearing assembly 36 is recessed into the one side of the gear 40 in counterbore 43. Gear 41 is freely mounted on the anti-friction bearing assembly 44 which in turn is mounted on shaft 8. The gear 41 at one side can abut against gear 40, and at the other side has a cone clutch element 45 recessed therein. A cone clutch element 46 is slidably fastened to shaft 8 by key 47 and is engageable with clutch element 45 so as to lock gear 41 to the shaft 8 when the shifting collar 26 is moved to the left, as viewed in Figure 3, by rotation in one direction by lever 25. When the collar is moved to the right by being rotated in the other direction, the spring 48 urges the cone clutch elements apart.

Another pair of gears 50 and 51 are mounted on shaft 9 between the thrust bearings 29 and 34. Gear 50 is freely rotatable on the bearing assembly 52, which is mounted on shaft 9 and this gear has a cone clutch element 53 recessed into its side face. Gear 51 is slidably splined on shaft 9 by key 54 and has a cone clutch element 55 formed at one side, as an integral part thereof, which is engageable in clutch element 53. A spring 56 is seated in a counterbore 57 of gear 51 and acts against bearing assembly 52 to urge the clutch elements 53, 55 apart, that is, to the de-clutched position. These elements are engaged when gear 51 is shifted axially toward gear 50 by rotation of shifting collar 23 in one direction. Rotation of the collar in the opposite direction shifts gear 51 out of driving contact with gear 50.

Gears 40 and 50 are in constant mesh with each other and gears 41 and 51 are also in constant mesh with one another.

It will be noted that relatively little space is required between gears 50 and 51 and yet clutch elements are provided therebetween. A spring means 59 is provided between these gears for urging them apart and requires no axial space because it is set into the gears themselves, thereby holding the axial dimensions to that required only by the gears themselves.

The bearing carriers 28 and 31 permit the space within the sleeve 20, 17, respectively, to be utilized for mounting the bearing assemblies 29, 32, thus conserving axial space.

Any axial thrust produced by operation of the cone clutches is absorbed by the axial thrust bearings between which they are mounted.

By locating the clutch elements in the large gears good holding surface areas are provided.

In operation, when the lever 25 is moved in one direction the collars 23, 26 move axially in opposite directions to engage one clutch and disengage the other. For example, movement of collar 26 to the left causes clutch 45—46 to be engaged and simultaneous movement of collar 23 to the right permits the spring 56 to disengage clutch 53—55. As a result, the power from shaft 8 is transmitted through element 46, gear 41, gear 51 and out shaft 9. This would be the high speed output of the unit.

When lever 25 is moved in the opposite direction from that mentioned above, clutch 45—46 would be dis-engaged and clutch 53—55 engaged. In that situation, the power is transmitted from shaft 8, via gear 40, and through the gears 50 and 51 which are then locked together, and out shaft 9. This would be the low speed ratio.

To effect the speed change it is only necessary to swing the lever and this may be done while power is being transmitted.

Figure 2:
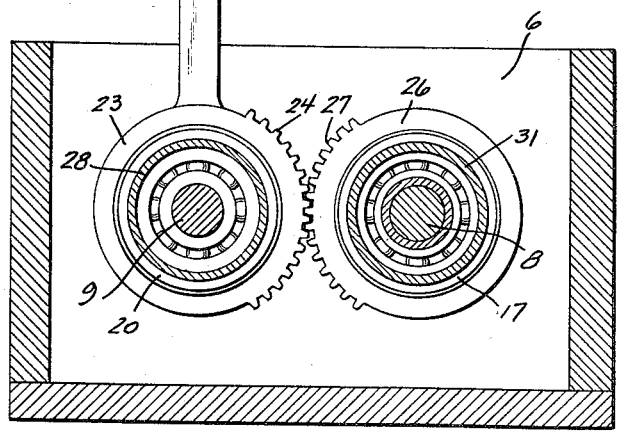
Figure 2 is a sectional view taken on line 2—2 of Figure 3 but on a reduced scale, and showing the shifting means.

When the lever is moved to a central position as shown in Figure 2, the clutches are both disengaged and a neutral position is provided where shaft 9 does not turn. In this situation the gear 50 is rotated freely on the shaft 9 by gear 40.

The invention provides for axial shifting of two collars in opposite directions by a single movement of a lever with uninterrupted power delivery. Simultaneous clutching and de-clutching of particularly compact gear and clutch combinations are thereby effected, the entire arrangement providing an efficient and compact two speed gear unit.

Various modes of carrying out the invention are contemplated as being within the scope of the following claims particularly pointing out and distinctly claiming the subject matter which is regarded as the invention.

I claim:

1. In a constant mesh speed change gear unit having an input shaft and also an output shaft in parallelism therewith, a support structure for rotatably mounting said shafts, a first gear secured to one of said shafts, a second gear freely rotatable on the other shaft for constant mesh with said first gear, a third gear freely rotatable on said one shaft, a fourth gear slidably splined to said other shaft for constant mesh with said third gear, first clutch means between said third gear and one shaft, second clutch means between said second and fourth gears, an axially shiftable collar on each of said shafts for actuating their respective clutch means, and means for simultaneously shifting said collars in axially opposite directions.

2. In a constant mesh speed change gear unit having an input shaft and also an output shaft in parallelism therewith, a support structure for rotatably mounting said shafts, a first gear secured to one of said shafts, a second gear freely rotatable on the other shaft for constant mesh with said first gear, a third gear freely rotatable on said one shaft, a fourth gear slidably splined to said other shaft for constant mesh with said third gear, first clutch means between said third gear and one shaft, second clutch means between said second and fourth gears, a threaded sleeve around each shaft and having similarly pitched threads, an axially shiftable collar threadably engaged on each of said sleeves, and means for simultaneously rotating said collars in opposite directions to cause actuation of said clutch means.

3. In a constant mesh speed change gear unit having an input shaft and also an output shaft in parallelism therewith, a support structure for rotatably mounting said shafts, a first gear secured to one of said shafts, a second gear freely rotatable on the other shaft for constant mesh with said first gear, a third gear freely rotatable on said one shaft, a fourth gear slidably splined to said other shaft for constant mesh with said third gear, a cone clutch element slidably splined on said one shaft, a complementary cone clutch element formed on said third gear for engagement with said slidable element, cone clutch elements formed on said second and fourth gears, an axially shiftable collar on each of said shafts for actuating their respective clutch elements, and means for simultaneously shifting said collars in axially opposite directions.

4. In a constant mesh speed change gear unit having an input shaft and also an output shaft in parallelism therewith, a support structure for rotatably mounting said shafts, a first gear secured to one of said shafts, a second gear freely rotatable on the other shaft for constant mesh with said first gear, a third gear freely rotatable on said one shaft, a fourth gear slidably splined to said other shaft for constant mesh with said third gear, a cone clutch element slidably splined on said one shaft, a complementary cone clutch element formed on said third gear for engagement with said slidable element, cone clutch elements formed on said second and fourth gears, a threaded sleeve around each shaft and having similarly pitched threads, an axially shiftable collar threadably engaged on each of said sleeves, and means for simultaneously rotating said collars in opposite directions to cause actuation of said clutch elements.

5. In a constant mesh speed change gear unit having an input shaft and also an output shaft in parallelism therewith, a support structure for rotatably mounting said shafts, a first gear secured to said input shaft, a second gear freely rotatable on said output shaft for constant mesh with said first gear, a third gear freely rotatable on said input shaft, a fourth gear slidably splined to said output shaft for constant mesh with said third gear, a cone clutch element formed in said third gear, an axially slidable cone clutch element splined to said input shaft for engagement with said third gear, complementary cone clutch elements formed integral with said second and fourth gears, an axially shiftable collar on each of said shafts for actuating their respective clutch elements, and means for simultaneously shifting said collars in axially opposite directions.

6. In a constant mesh speed change gear unit having an input shaft and also an output shaft in parallelism therewith, a support structure for rotatably mounting said shafts, a first gear secured to said input shaft, a second gear freely rotatable on said output shaft for constant mesh with said first gear, a third gear freely rotatable on said input shaft, a fourth gear slidably splined to said output shaft for constant mesh with said third gear, a cone clutch element formed in said third gear, an axially slidable cone clutch element splined to said input shaft for engagement with said third gear, complementary cone clutch elements formed integral with said second and fourth gears, a threaded sleeve around each shaft and having similarly pitched threads, an axially shiftable collar threadably engaged on each of said sleeves, and means for simultaneously rotating said collars in opposite directions to cause actuation of said clutch elements.

7. In a speed change gear unit having a support structure, an input shaft and an output shaft rotatably mounted in said structure and arranged in spaced parallel relationship to one another, a first gear secured to one of said shafts, a second gear freely rotatable on the other shaft for constant mesh with said first gear, a third gear freely rotatable on said one shaft, a fourth gear slidably splined to said other shaft for constant mesh with said third gear, first clutch means between said third gear and one shaft, second clutch means between said second and fourth gears, and means for simultaneously shifting said clutches in axially opposite directions.

8. In a speed change gear unit having a support structure, a pair of spaced parallel shafts rotatably mounted in said structure, a first gear secured to one of said shafts, a second gear freely rotatable on the other shaft for constant mesh with said first gear, a third gear freely rotatable on said one shaft, a fourth gear slidably splined to said other shaft for constant mesh with said third gear, a cone clutch element splined to said one shaft for engagement with said third gear, complementary cone clutch elements formed integral with said second and fourth gears, and means for simultaneously sliding said cone clutch element on said one shaft and said fourth gear on said other shaft in opposite directions.

References Cited in the file of this patent

UNITED STATES PATENTS

| | | |
|---|---|---|
| 1,191,892 | Harriman | July 18, 1916 |

FOREIGN PATENTS

| | | |
|---|---|---|
| 182,719 | Great Britain | July 13, 1922 |